May 27, 1924.
G. E. DANIELS
1,495,578
DISAPPEARING WINDSHIELD
Filed April 7, 1920
2 Sheets—Sheet 1
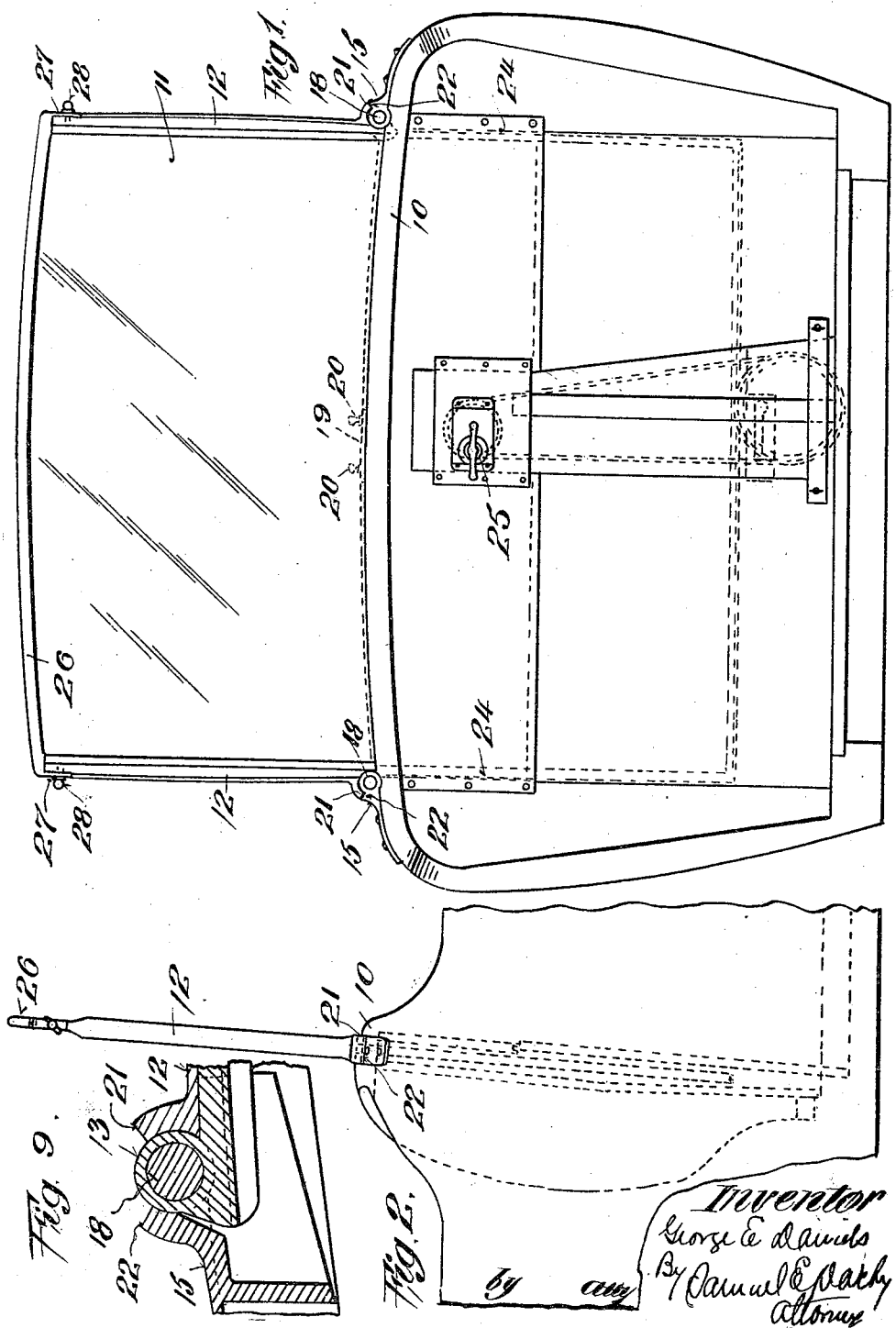

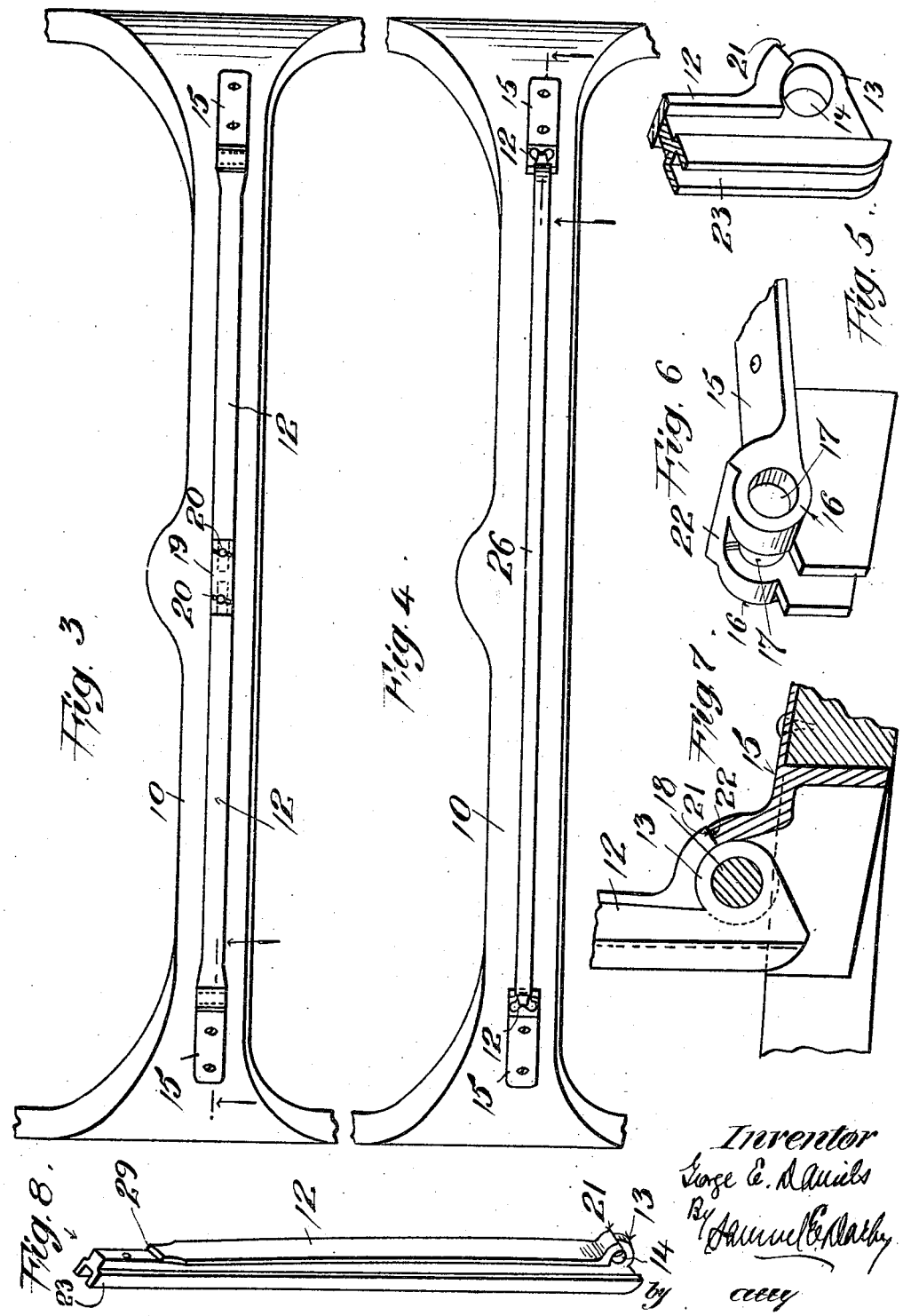

Patented May 27, 1924.

1,495,578

UNITED STATES PATENT OFFICE.

GEORGE E. DANIELS, OF READING, PENNSYLVANIA.

DISAPPEARING WINDSHIELD.

Application filed April 7, 1920. Serial No. 371,841.

*To all whom it may concern:*

Be it known that I, GEORGE E. DANIELS, a citizen of the United States, residing at Reading, in the county of Berks, State of Pennsylvania, have made a certain new and useful Invention in Disappearing Windshields, of which the following is a specification.

This invention relates to windshields for automobiles, and particularly to windshields designed to protect the occupants of the rear seat of an open touring car.

The object of the invention is to provide a windshield structure for the rear seat of an automobile, which is simple, economical to construct and efficient in operation.

A further object is to provide a windshield for the rear seat of an automobile and a housing therefor in the cowl or seat back of the front seat, into which the windshield may be lowered and concealed when not required for use, and from which it can be readily and easily raised when desired.

Other objects of the invention will appear more fully hereinafter.

The invention consists substantially in the construction, combination, location, relative arrangement and details, all as will be more fully hereinafter set forth, as shown in the accompanying drawings and finally pointed out in the appended claims.

In the drawings—

Fig. 1 is a view in rear elevation of front seat back or cowl of an automobile showing the application thereto of a disappearing windshield embodying the principles of my invention.

Fig. 2 is a view in side elevation of the same.

Fig. 3 is a top plan view of the same, with the windshield housed and concealed in a pocket therefor in the front seat back.

Fig. 4 is a view similar to Fig. 3, with the windshield in raised position.

Fig. 5 is a broken detail view in perspective of the hinge end of a channel post, in which the end of the windshield is received and guided while being raised out of or lowered into its housing pocket.

Fig. 6 is a similar view of the hinge strap to which the channel post is pivotally connected.

Fig. 7 is a broken detail view in side elevation, parts in vertical section, showing a channel post connected to its hinge strap and rocked into vertical position.

Fig. 8 is a detached detail view in perspective of a channel post.

Fig. 9 is a view similar to Fig. 7, showing the channel post rocked down into horizontal position.

Th same part is designated by the same reference numeral wherever it occurs throughout the several views.

Referring to the accompanying drawings 10 designates the cowl which separates the front seat from the tonneau of the car, and constitutes the front seat back. This seat back is formed with a pocket which forms a receptacle to receive the windshield 11, when not required for use, said windshield being lowered into the pocket or raised up out of it through an opening in the top rail of the seat back 10. When the windshield is lowered into the pocket, the opening in the top rail is closed by folding down over said top rail the two side posts 12. Each of these parts is formed with an ear 13 which is provided with a hole 14 therethrough. A hinge strap 15 is secured to the top rail of the front seat back at each side edge of the pocket therein, and is formed with a pair of lugs 16 with aligned holes 17 therethrough. The ear 13 of the side post is received between the lugs 16 of the hinge strap and a hinge pin 18 passing through the holes 14, 17, serves to pivotally connect the post to the hinge strap. When the windshield is not required for use it is lowered into the pocket in the front seat back and the two side posts 12 are swung down upon the top rail of the front seat back and are retained in their folded position by means of a detachable plate 19 placed over the joint between their abutting free ends. This plate 19 may be secured to the ends of the side posts in any suitable or convenient manner, as for example, by means of the thumb screws 20. By removing the retaining plate 19, the side posts 12 may be rocked or swung into vertical position, as shown in Figs. 1 and 2, thereby uncovering the slot in the top rail of the front seat back and enabling the windshield to be raised out of its housing pocket. The side posts are provided with shoulders 21 which abut against co-operating shoulders 22 formed on the hinge straps, when said posts are raised into vertical position and are thereby prevented from being rocked too far into raised position. The side posts 12 are formed with or have secured thereto, on the faces thereof, which oppose each other when said posts are in vertical position, suitable guide channels 23 in which the ends of the windshield are received and are guided. In like manner and for like purpose the vertical end walls of the pocket into which the windshield is lowered when not required for use is formed with guiding channels indicated in dotted lines at 24 in Fig. 1.

The windshield 11 may be lowered into its housing pocket when not required for use, or raised up out of said pocket when required for use, by hand or by any desired or suitable manually actuated mechanism. I have indicated at 25 in Fig. 1 a manually operable mechanism which I have found to be simple and efficient for the purpose.

When the side posts are rocked into their vertical position, their upper ends afford a support for a connecting rail 26, the ends 27 of which engage over the free ends of the side posts and are detachably secured thereto, as for example, by the thumb screws 28. This rail member 26 not only serves to maintain the side posts in their vertical positions but it also affords means for attaching a top curtain thereto when desired. This feature, however, may, as indicated at 29, be dispensed with if not required.

It will be seen that the side posts 12 are shorter at their free ends than the channels 23, thereby providing a seat to receive the ends 27 of the rail member 26, or the retaining plate 19.

From the foregoing description, it will be seen that I provide an exceedingly simple windshield structure for protecting the occupants of the rear seat, and which, when not required for use, is lowered into a pocket in the front seat back and housed and concealed therein. The channel side posts when folded down onto the top rail of the front seat back not only conceals the opening into the pocket, but also forms a neat finish for the top rail of the seat back. The guiding channels formed in or carried by the side posts and the end walls of the pocket not only guide the windshield while being raised or lower but also serve to efficiently retain the vertical end edges of the windshield and prevent the same from rattling.

Having now set forth the objects and nature of my invention and a construction embodying the principles thereof, what I claim as new and useful, and of my own invention, and desire to secure by Letters Patent, is:—

1. A seat back for an automobile having a vertically disposed pocket therein, side posts hinged to the upper edge of the seat back at the opposite side edges of said pocket, and provided with channel members on their inner faces, said channel members aligning with the side edges of said pocket when said posts are in raised position, said posts when in folded down position forming a cover for said pocket, said posts being shorter than the channel members to form shouldered seats at the free ends of said posts, and a rail member having portions to engage in said shouldered seats to hold said posts in raised position.

2. A seat back for an automobile having a vertically disposed pocket therein, side posts hinged to the upper edge of the seat back at the opposite side edges of said pocket, and provided with channel members on their inner faces, said channel members aligning with the side edges of said pocket when said posts are in raised position, said posts when in folded down position forming a cover for said pocket, said posts being shorter than the channel members to form shouldered seats at the free ends of said posts, and a removable retaining member to engage in said seats when the posts are in folded down position.

In testimony whereof I have hereunto set my hand on this 27th day of March A. D. 1920.

GEORGE E. DANIELS.